United States Patent
Sawal et al.

(10) Patent No.: US 12,294,492 B1
(45) Date of Patent: May 6, 2025

(54) CONFIGURATION MANAGEMENT USING KNOWLEDGE GRAPHS

(71) Applicant: Dell Products L.P., Round Rock, TX (US)

(72) Inventors: Vinay Sawal, Fremont, CA (US); Tsehsin Jason Liu, Wellesley, MA (US)

(73) Assignee: Dell Products L.P., Round Rock, TX (US)

( * ) Notice: Subject to any disclaimer, the term of this patent is extended or adjusted under 35 U.S.C. 154(b) by 3 days.

(21) Appl. No.: 18/426,812

(22) Filed: Jan. 30, 2024

(51) Int. Cl.
    *G06F 15/16*     (2006.01)
    *G06N 20/00*     (2019.01)
    *H04L 41/082*     (2022.01)

(52) U.S. Cl.
    CPC ........... *H04L 41/082* (2013.01); *G06N 20/00* (2019.01)

(58) Field of Classification Search
    CPC .............................. H04L 41/082; G06N 20/00
    USPC ........................................................ 709/221
    See application file for complete search history.

(56) References Cited

U.S. PATENT DOCUMENTS

| | | | |
|---|---|---|---|
| 10,467,049 B2 | 11/2019 | Tarasuk-Levin et al. | |
| 10,542,015 B2 | 1/2020 | Bird et al. | |
| 10,606,958 B2 * | 3/2020 | Bacarella | G06N 5/043 |
| 10,783,185 B2 * | 9/2020 | Murray | G06N 5/022 |
| 10,789,006 B1 | 9/2020 | Gokam et al. | |
| 11,036,718 B2 * | 6/2021 | Lecue | G06F 16/245 |
| 11,507,099 B2 * | 11/2022 | Stetson | G06F 18/29 |
| 11,507,851 B2 * | 11/2022 | Lee | G06N 5/022 |
| 11,526,849 B2 * | 12/2022 | Lecue | G06N 20/00 |
| 11,614,899 B1 | 3/2023 | Salamon et al. | |
| 11,625,617 B2 * | 4/2023 | Okajima | G06F 18/2323 706/45 |
| 11,625,620 B2 | 4/2023 | Singaraju et al. | |
| 11,645,314 B2 * | 5/2023 | Huang | G06F 16/3328 706/50 |
| 11,783,131 B2 * | 10/2023 | Yuan | G06N 20/00 704/9 |
| 11,874,939 B2 * | 1/2024 | Vangala | G06F 16/9024 |
| 12,101,237 B2 * | 9/2024 | Jin | H04L 41/5019 |

(Continued)

OTHER PUBLICATIONS

Mandal, Shantanu, et al., "Large Language Models Based Automatic Synthesis of Software Specifications," arXiv preprint arXiv:2304.09181 (2023) (12 Pages).

(Continued)

*Primary Examiner* — Moustafa M Meky
(74) *Attorney, Agent, or Firm* — WOMBLE BOND DICKINSON (US) LLP

(57) ABSTRACT

Methods and systems for managing a configuration of a client deployment to provide a service are disclosed. The configuration may be managed by managing configuration drift that may occur in the configuration of the client deployment. The configuration drift may be managed by monitoring for changes in the configuration and restoring the configuration to a goal configuration. The changes may be monitored by constructing knowledge graphs using the configurations. A knowledge graph of a current configuration may be compared to a knowledge graph of a goal configuration to find a difference. The difference may represent a configuration drift. The configuration drift in the current configuration may be remedied to restore the current configuration to the goal configuration.

20 Claims, 8 Drawing Sheets

(56) References Cited

U.S. PATENT DOCUMENTS

| | | | | |
|---|---|---|---|---|
| 12,199,813 | B2* | 1/2025 | Gupta | H04L 12/12 |
| 2020/0073976 | A1* | 3/2020 | Lecue | G06F 16/245 |
| 2020/0097601 | A1* | 3/2020 | Han | G06F 16/36 |
| 2022/0147839 | A1* | 5/2022 | Macedo | G06F 16/287 |
| 2022/0404153 | A1* | 12/2022 | Meng | G06V 10/7747 |
| 2023/0412634 | A1* | 12/2023 | Engelberg | G06N 5/04 |
| 2024/0007363 | A1* | 1/2024 | Jin | H04L 41/16 |
| 2024/0143638 | A1* | 5/2024 | Maya | G06F 16/3347 |
| 2024/0296079 | A1* | 9/2024 | Portisch | G06N 5/022 |
| 2024/0296080 | A1* | 9/2024 | Portisch | G06F 9/542 |
| 2025/0028518 | A1* | 1/2025 | Portisch | G06F 8/658 |

OTHER PUBLICATIONS

Xie, Danning, et al., "Impact of Large Language Models on Generating Software Specifications," arXiv preprint arXiv:2306.03324 (2023) (12 Pages).

"Recommendation," Amazon Web Services, Web Page <https://docs.aws.amazon.com/dms/latest/APIReference/API_Recommendation.html> accessed on Sep. 28, 2023 (3 Pages).

"Azure Database Migration Service," Microsoft, Web Page <https://azure.microsoft.com/en-us/products/database-migration> accessed on Sep. 28, 2023 (6 Pages).

"Triggering conditions for storage system internal resource alerts," IBM, Web Page <https://www.ibm.com/docs/en/storage-insights?topic=alerts-triggering-conditions-storage-system-internal-resource> accessed on Oct. 2, 2023 (34 Pages).

"What is a Knowledge Graph?" Ontotext USA, Inc., Web Page <https://www.ontotext.com/knowledgehub/fundamentals/what-is-a-knowledge-graph/> accessed on Oct. 2, 2023 (5 Pages).

\* cited by examiner

CONFIGURATION MANAGEMENT USING KNOWLEDGE GRAPHS

FIELD

Embodiments disclosed herein relate generally to managing a configuration of a client deployment to provide a service. More particularly, embodiments disclosed herein relate to managing changes in the configuration over time which may lower quality of the service by a client deployment.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
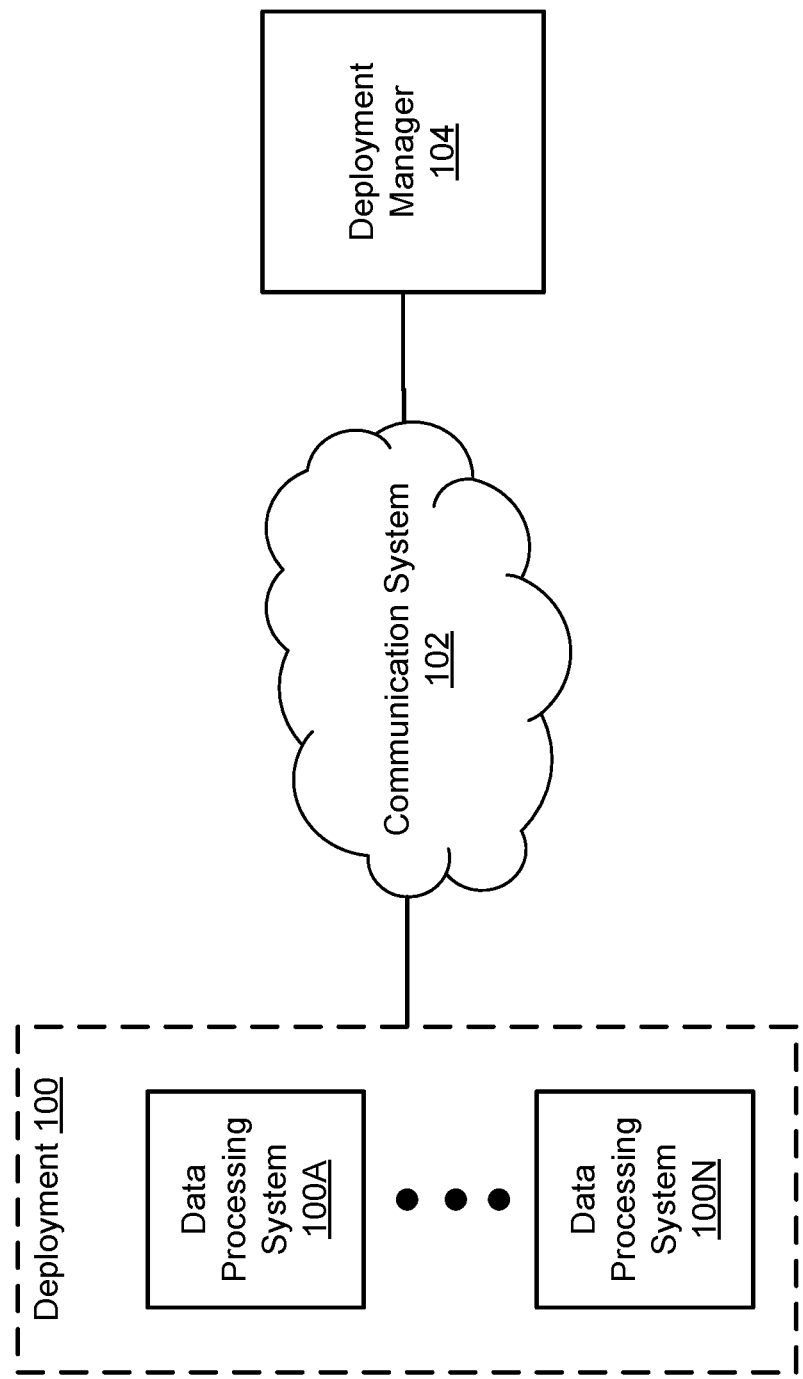
FIG. 1 shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing a configuration of a client deployment to provide a service. The configuration may be managed by managing configuration drift that may occur in the configuration of the client deployment. The configuration drift may be managed by monitoring for changes in the configuration and restoring the configuration to a goal configuration.

Configuration drift may occur in a configuration when characteristics of a configuration may change over time. The characteristics of the configuration may change over time due to i) errors that modify the configuration, ii) maintenance requests that might be performed on the configuration, and/or iii) modifications that might be performed on the configuration in a client deployment to meet evolving needs of a client.

As the changes may alter the configuration of the client deployment, the changes may reduce the quality of service and even undermine minimum requirements for performance of a service by the client deployment. The minimum requirements may include a subset of requirements necessary for a quality of service provided by the goal configuration. The goal configuration may include the requirements for the quality of service provided by the goal configuration.

To remove configuration drift in the configuration and restore the configuration to the goal configuration, a knowledge graph may be implemented. The knowledge graph may represent a configuration as nodes and edges. The nodes may include configuration characteristics and the edges may include relationships between the nodes.

Knowledge graphs may be constructed for a current configuration, an acceptable configuration, and an optimized configuration. A first knowledge graph may include the current configuration, which includes a configuration that has underwent configuration drift. A second configuration may include a configuration with the subset of the requirements necessary for the quality of service provided by the goal configuration. A third knowledge graph may include the goal configuration, which may include the requirements for the quality of service.

A first comparison may be made between the first knowledge graph and the second knowledge graph to find a first difference. The first difference may be used to update the current configuration to include the subset of the requirements necessary for the quality of service. Next, a second comparison may be made between the first knowledge graph and the third knowledge graph to find a second difference. The second difference may be used to update the current configuration to include the requirements necessary for the quality of service.

In an embodiment, a method for managing a configuration of a client deployment to provide a service to a client. The method may include i) obtaining a current configuration of a client deployment that has been previously configured based on a goal configuration that is trusted to enable the client deployment to provide the service to the client; ii) obtaining, based on the current configuration of the client deployment, a first knowledge graph; iii) making a first comparison of the first knowledge graph to a second knowledge graph having a subset of requirements specified by the goal configuration to identify whether the first knowledge graph meets the subset of the requirements; iv) in a first instance of the comparing where the first knowledge graph does not meet the subset of the requirements: a) identifying, based on the first knowledge graph and the second knowledge graph, a first configuration drift of the client deployment that is likely to impair the service provided to the client; b) identifying, based on the first configuration drift, a first remedial action to be performed to update the client deployment to meet the subset of the requirements; c) performing the first remedial action to obtain a first updated client deployment; and d) using the first updated client deployment to continue to provide the service to the client.

The method may further include, in a second instance of the comparing where the first knowledge graph meets the subset of the requirements: i) making a second comparison of the first knowledge graph to a third knowledge graph having the requirements specified by the goal configuration to identify whether the first knowledge graph meets the requirements; ii) in a first instance of the second comparison where the first knowledge graph does not meet the requirements: a) identifying, based on the first knowledge graph and the third knowledge graph, a second configuration drift of the client deployment that is likely to reduce a quality of the service provided to the client; b) identifying, based on the second configuration drift, an optimization action to be performed to update the client deployment to meet the requirements; c) performing the optimization action to obtain a second updated client deployment; and d) using the second updated client deployment to continue to provide the service to the client.

The first knowledge graph documents the current configuration of the client deployment, the first knowledge graph may include: i) nodes that represent characteristics for the client deployment; and ii) edges that represent relationships of the characteristics of the client deployment.

The second knowledge graph documents a configuration having a subset of requirements specified by the goal configuration of the client deployment, the first knowledge graph may include: i) second nodes that represent second characteristics for the client deployment; and ii) second edges that represent second relationships of the characteristics of the client deployment.

The third knowledge graph documents the goal configuration for the client deployment, the third knowledge graph may include: i) third nodes that represent third characteristics for the client deployment; and ii) third edges that represent third relationships of the third characteristics for the client deployment.

The first configuration drift may indicate a difference in characteristics for the client deployment between the first knowledge graph and the second knowledge graph.

The second configuration drift may indicate a difference in characteristics for the client deployment between the first knowledge graph and the third knowledge graph.

Making the first comparison may include: i) comparing first nodes of the first knowledge graph to second nodes of the second knowledge graph; ii) in a first instance of the comparing where the first nodes match the second nodes: a) concluding that the first knowledge graph meets the subset of the requirements; and ii) in a second instance of the comparing where the first nodes do not match the second nodes: a) concluding that the first knowledge graph does not meet the subset of the requirements.

Comparing the first nodes of the first knowledge graph to the second nodes of the second knowledge graph may include traversing, based on at least characteristics of the client, the second knowledge graph to identify the second nodes.

The second knowledge graph may include a set of nodes, at least a first portion of the set of nodes are based on the characteristics of the client and a second portion of the set of nodes are based on the subset of the requirements, and the second nodes are part of the second portion of the set of nodes.

Making the second comparison may include: i) comparing first nodes of the first knowledge graph to third nodes of the third knowledge graph; ii) in a first instance of the comparing where the first nodes match the third nodes: a) concluding that the first knowledge graph meets the requirements; and iii) in a second instance of the comparing where the first nodes do not match the third nodes: a) concluding that the first knowledge graph does not meet the requirements.

Comparing the first nodes of the first knowledge graph to the third nodes of the third knowledge graph may include traversing, based on at least characteristics of the client, the third knowledge graph to identify the third nodes.

The third knowledge graph may include a set of nodes, at least a first portion of the set of nodes are based on the characteristics of the client and a second portion of the set of nodes are based on the requirements, and the third nodes are part of the second portion of the set of nodes.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

To provide the computer implemented services, various data processing systems may be configured in predetermined manners to place them in operating states that are known to allow the computer implemented services to be provided. However, overtime the configuration of the data processing systems may change (e.g., drift from a predetermined configured) due to a variety of causes.

For example, software hosted by a data processing system may be changed (e.g., updated, corrupted, etc.). Likewise, changes to hardware components may also result in changes in the configuration of a data processing system.

Such changes may or may not impact the ability of a data processing system to provide a computer implemented services. For example, multiple configurations of data processing systems may allow for desired computer implemented services to be provided. In other words, while data processing systems may drift from one known good configuration to another, the other configuration may or may not also be a known good configuration.

Accordingly, changes to configuration of data processing systems along may not necessarily indicate a change in the ability of the data processing systems to provide desired computer implemented services.

In general, embodiments disclosed here relate to systems and methods for managing of configurations of data processing systems to provide desired computer implemented services. The configurations of the data processing systems may be managed by ascertaining whether changes in configurations of data processing systems have caused a drift that is likely to deprive the ability of the data processing systems to provide desired computer implemented services.

Such drifts that are likely to deprive the ability of the data processing systems to provide the computer implemented services by (i) generating a graph representation of the deployment, and (ii) attempting to match the graph subgraphs of graphs representing (a) all acceptable configurations (e.g., also referred to as minimum configurations) for the data processing systems and (b) preferred (e.g., optimized) configurations (e.g., also referred to as goal configurations) for the data processing systems. The acceptable configurations may allow for the desired computer implemented services to be provided while the preferred configurations may allow the computer implemented services to be provided in a preferred manner (e.g., efficient use of computing resources, lower likelihood of errors/security threats being exploited, etc.).

The configurations of the data processing systems may be compared by (i) converting the configuration into a first knowledge graph, (ii) converting the acceptable configurations into a second knowledge graph, (iii) converting the goal configurations into a third knowledge graph, (iv) comparing the first knowledge graph with the second knowledge graph, and (v) comparing the first knowledge graph with the third knowledge graph. The comparisons may be made for sub-graph matching purposes (e.g., identifying whether the first knowledge graph can be matched to portions of the other knowledge graphs).

A knowledge graph may include nodes and edges. The nodes may represent characteristics of a deployment (e.g., as selected by a customer), and the edges may represent relationships (e.g., dependencies) between the characteristics of the deployment. Thus, the knowledge graph may only include nodes corresponding to selections by customers (as opposed to including nodes corresponding to possible but unselected configurations by a customer).

If drifts are identified, then the configurations of the data processing systems of the deployment may be updated. For example, various information (e.g., warnings regarding the drifts, recommendations regarding changes to configurations to address the drifts, etc.) regarding the drifts may be communicated to system administrators, automated management systems, and/or other entities. The aforementioned information may be used to trigger automated, semiautomated, and/or manual management processes.

For example, in the case of an automated process, automation engines hosted by the data processing systems may be instructed to perform various operations based on the information to manage impacts of the drifts. The operations may correct the drift, or may otherwise change the operation of the data processing systems to avoid undesired impacts of the drifts.

By doing so, embodiments disclosed herein may provide a system that is more likely to be able to provide desired computer implemented services overtime by identifying and addressing changes in configurations of data processing systems that represent drifts that are likely to impact the computer implemented services.

To provide the above noted functionality, the system may include deployment 100, and deployment manager 104. Each of these components is discussed below.

Deployment 100 may provide desired computer implemented services. To provide the computer implemented services, deployment 100 may include any number of data processing systems 100A-100N. Data processing systems 100A-100N may (i) contribute to the computer implemented services, (ii) provide information regarding its configuration to deployment manager 104, and (iii) update its configuration based on information provided by deployment manager 104.

Deployment manager 104 may provide management services for deployment 100. The management services may be performed by (i) monitoring the configurations of data processing systems 100A-100N, (ii) identifying whether the configurations are acceptable and/or may be improved, and (iii) when the configurations are unacceptable and/or may be improved, deployment manager 104 may provide information and/or initiate changes to the configurations of data processing systems 100A-100N.

Figure 2A:
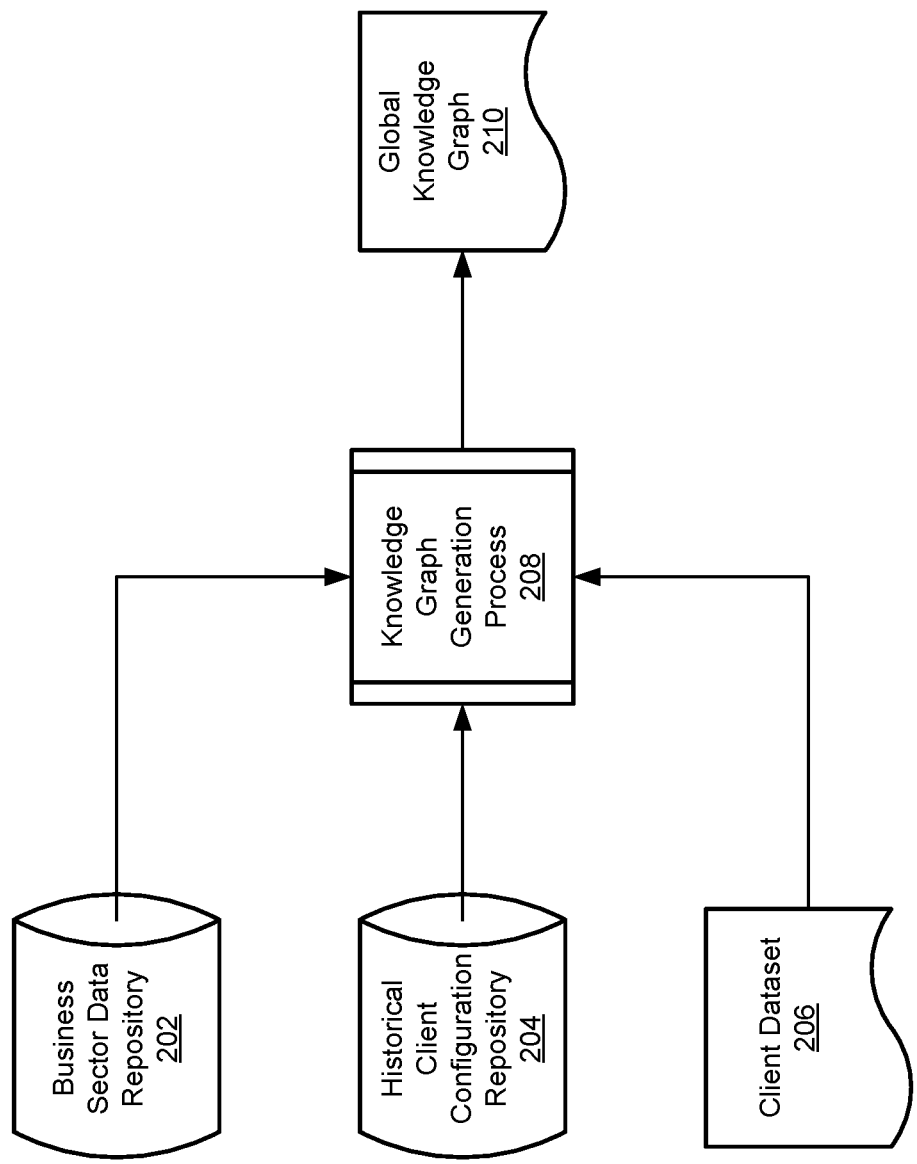
FIGS. 2A-2B show data flow diagrams illustrating operation of a system in accordance with an embodiment.

To identify whether the configurations are acceptable, deployment manager 104 may maintain various knowledge graphs. The knowledge graphs may be based on acceptable and goal configurations. Refer to FIG. 2A for additional details regarding knowledge graphs based on acceptable and/or goal configurations.

Figure 2B:
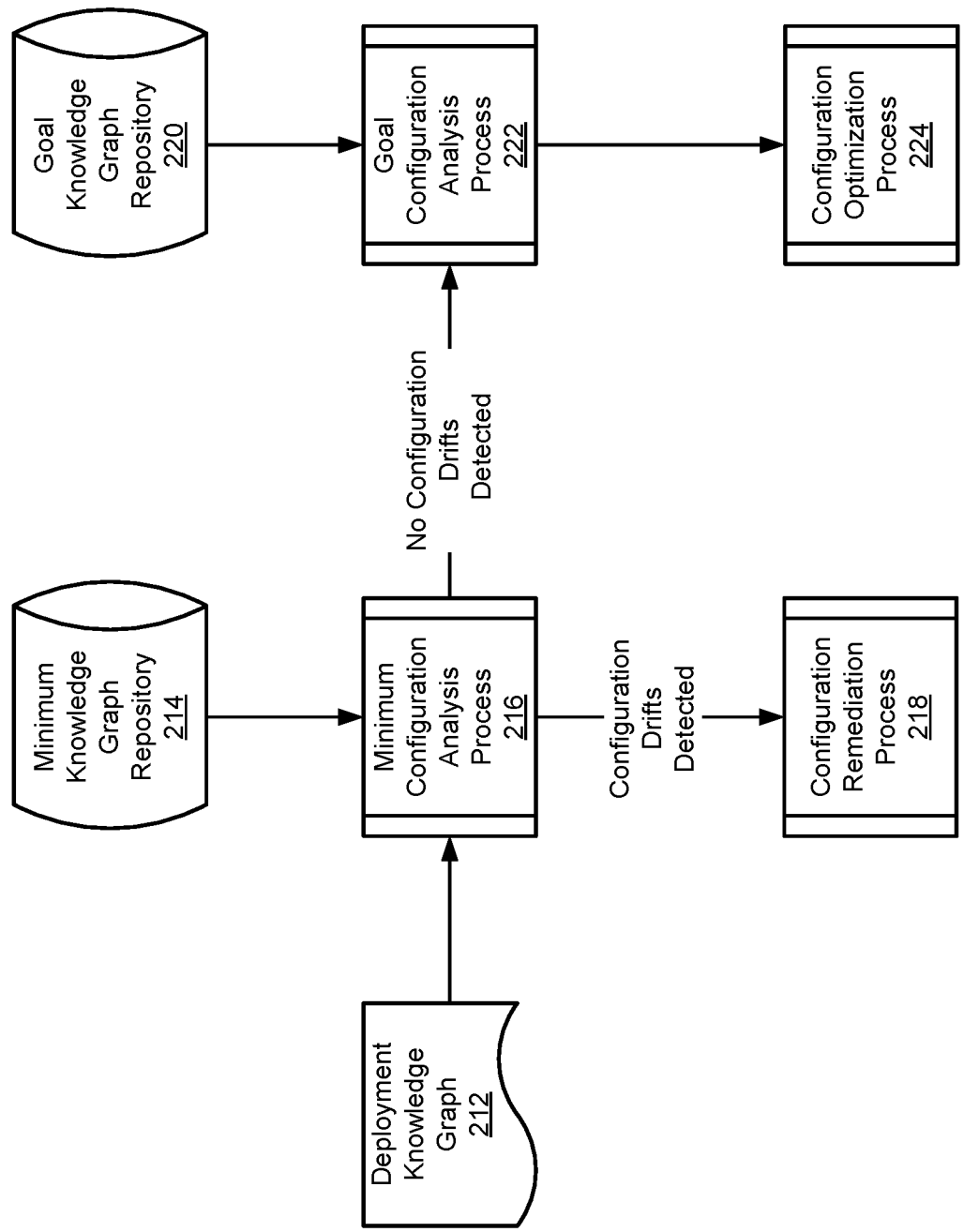

To determine whether configurations of data processing systems should be change, a graph data structure (e.g., another knowledge graph) based on the configurations of the data processing systems may be obtained. This new graph data structure may then be attempted to be matched to the knowledge graphs. If no match can be made, then it may be concluded that a drift has occurred and remedial action (e.g., alerting, automatic changing, etc.) may be performed. Refer to FIG. 2B for additional details regarding identification of drift using data structures.

In an embodiment, users of deployment 100 contract with operators of deployment manager 104 for desired computer implemented services. For example, it may be the responsibility of an operator of deployment manager 104 to maintain deployment 100 in a manner that allows for the computer implemented services to be provided. A subscription model for such services may be utilized, which may define responsibilities, cost, and/or other aspects of the relationship between users of computer implemented services provided by deployment 100 and operators of deployment manager 104 and/or deployment 100.

While providing their functionality, any of deployment 100 and deployment manager 104 may perform all, or a portion, of the flows and methods shown in FIGS. 2A-3B.

Any of (and/or components thereof) deployment 100 and deployment manager 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the Internet protocol).

While illustrated in FIG. 1 as including a limited number of specific components, a system in accordance with an embodiment may include fewer, additional, and/or different components than those components illustrated therein.

To further clarify embodiments disclosed herein, data flow diagrams in accordance with an embodiment are shown in FIGS. 2A-2B. In these diagrams, flows of data and processing of data are illustrated using different sets of shapes. A first set of shapes (e.g., 210, 212, etc.) is used to represent data structures, a second set of shapes (e.g., 208, 216, etc.) is used to represent processes performed using and/or that generate data, and a third set of shapes (e.g., 214, 220, etc.) is used to represent large scale data structures such as databases.

Turning to FIG. 2A, a first data flow diagram in accordance with an embodiment is shown. The first data flow diagram may illustrate data used in and data processing performed in obtaining knowledge graphs.

To obtain a knowledge graph, knowledge graph generation process 208 may be performed. During client knowledge graph generation process 208, information regarding configurations of data processing of deployments that have provided computer implemented services in the past may be obtained. Once the information is obtained, the information may be organized as a directed heterogeneous graph of variables and values using Monodic Second order logic, and stored as global knowledge graph 210.

For example, the directed heterogenous graph may include sets of nodes with edges defining relationships between the sets. Each set of nodes may correspond to a corresponding portion of a configuration for data processing systems. Each set of nodes may include any number of sub-nodes corresponding to values for that variable that were identified based on the information. For example, if two deployments are identified that provide a same service and have two different values for a same portion of a configuration (e.g., data processing systems in the first deployment utilize data redundancy in their storage systems while data processing systems in the second deployment use high availability in their storage systems), then the set of nodes corresponding to the configuration defining how a storage system must be configured for a given computer implemented services may include two sub-nodes corresponding to redundancy and high availability, respectively.

The edges between the nodes may define constraints. For example, returning to the storage example, the second deployment use high availability rather than redundancy because other configurations of the second deployment provide for data backup. Thus, to fully define this configuration, an edge between the sub-node representing the high availability value may be connected to another sub-node representing the configuration that provides for data backup. Thus, for a configuration of a deployment to match this set of sub-nodes, the configuration of the deployment must include both data availability and backup. If only data availability is configured, then the configuration of the deployment would not match this set of sub-nodes and the configuration may be flagged as being a drift if no other match is possible.

The information used to construct the knowledge graphs may be obtained from business sector data repository 202, historical client configuration repository 204, and client configuration dataset 206. Each of these data structures is discussed below.

Business sector data repository 202 may include information regarding configurations of data processing systems used to provide services that fall within different business sectors. The information may be obtained from any source and using any process. Different sectors of businesses may include, for example, banking, technology, and/or research areas.

Historical client configuration repository 204 may include information regarding configurations of data processing systems used to provide services to current and/or past customers. The information may be obtained, for example, through subscriptions for services provided by an operator of a deployment manager.

Client dataset 206 may include information regarding a client requesting that services be provided to them. For example, client dataset 206 may include business sector information and/or other information about a client.

The resulting global knowledge graph 210 may include (i) nodes related to different customers, (ii) nodes related to different sectors, (iii) nodes related to different products, etc. Any of these nodes may be related to sets of nodes for configurations of data processing systems have been deemed able to provide desired computer implemented services. Each of the sets of nodes may include sub-nodes corresponding to the specific values for each configuration of the configurations (e.g., deduplication ratio, management controller settings, etc.). Any of the sub-nodes may be related to other sub-nodes by edges thereby defining sets of values for the configurations that are known to be acceptable.

Thus, to traverse the global knowledge graph, information regarding a client may be used to identify a portion of the graph that includes some sets of knowledge. A graph of the current configuration of a deployment may then be generated and attempted to be matched against the sets of nodes. If a match is identified, then the current configuration may be deemed acceptable. If no match is identified, then the current configuration of the deployment may be deemed to have drifted from the set of configurations deemed to be acceptable.

Turning to FIG. 2B, a second data flow diagram in accordance with an embodiment is shown. The second data flow diagram may illustrate data used in and data processing performed in identifying configurations for data processing systems to provide desired computer implemented services.

To identify the configurations, minimum configuration analysis process 216 may be performed. During minimum configuration analysis process 216, a deployment knowledge graph 212 for a deployment that will be used to provide desired computer implemented services may be obtained. Client knowledge graph 212 may be obtained by obtaining the current configurations of data processing systems of the deployment, and using the obtained configurations to generate a directed heterogenous graph, similar to the global knowledge graph discussed above but only including content for a single deployment wherein the global knowledge graph includes content based on multiple deployments.

Once deployment knowledge graph 212 is obtained, information regarding the client (e.g., business sector, subscribed to services/products, etc.) may be used to identify some number of portions of the global knowledge graph, which may be stored in minimum knowledge graph repository 214. Deployment knowledge graph 212 may then be matched against the portions of the global knowledge graph to identify if a match can be made. If a match can be made, then it may be concluded that the configuration at least meets a minimum standard sufficient for the computer implemented services to be provided and no configuration drifts may, consequently, be identified. If a match is made, then the flow may proceed to goal configuration analysis process 222. Otherwise, the flow may proceed to configuration remediation process 218.

Minimum knowledge graph repository 214 may include portions of the global knowledge graph that are associated with, for example, different business sectors, services, products, etc. These portions may be defined by the nodes corresponding the business sectors, services, products, etc. For example, a business sector and service may be used as keys to identify relevant nodes of the global knowledge graph. The identified nodes (which may be sets of nodes) may be extracted and stored as a group of nodes linked to the business sector and service. In this manner, any number of groups of nodes may be obtained for different business sectors, services, etc.

If a configuration drift is identified, then configuration remediation process 218 may be performed. During configuration remediation process 218, one or more actions may be performed. The one or more actions may be performed to alert various persons regarding the drift, to remediate the drift, and/or to otherwise manage the draft. For example, alerts to system administrators regarding the drift may be sent out which may cause the system administrators to modify the configuration of the deployment on which deployment knowledge graph 212 is based.

If no configuration drifts are identified, then goal configuration analysis process 218 may be performed. During goal configuration analysis process 222, deployment knowledge graph 216 may attempt to be matched to knowledge graphs (e.g., groups of nodes) from goal knowledge graph repository 220.

Goal knowledge graph repository 220 may include a subset of the groups of nodes stored in minimum knowledge graph repository 214, and that have been deemed to be the best set of configurations for a given goal. A similar matching process to that describe with respect to minimum configuration analysis process 216 may be performed. The result of the matching may be a match (e.g., indicating that the current configuration is a best possible configuration based on the information in a global knowledge graph) or a miss (e.g., indicating that the current configuration is not the best possible configuration).

If the configuration is the best possible configuration, then the flow may end. If the configuration is not the best possible configuration, then configuration optimization process 224 may be performed.

During configuration optimization process 224, one or more actions may be performed, similarly to configuration remediation process 218. The actions may include, for example, sending of notifications regarding changes that could be made to improve the quality of services provided by a deployment, initiating changes in configurations based on the miss (e.g., that if implemented would cause deployment knowledge graph 212 to match), and/or other actions..

Thus, using the data flow diagram shown in FIG. 2B, embodiments disclosed herein may facilitate identification and remediation of configuration drifts, and/or optimization of systems.

For example, the flow shown in FIG. 2B may be performed (i) immediately prior to configuring a deployment at all to identify how to change operation of a deployment to provide desired services, and/or (ii) overtime to identify and remediate drifts in the operation of the deployment.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIG. 1 may perform various methods to manage data processing systems. FIGS. 3A-3D illustrate flow charts of methods that may be performed by the components of the system of FIG. 1 in accordance with an embodiment. In the diagrams discussed below and shown in FIGS. 3A-3D, any of the operations may be repeated, performed in different orders, and/or performed in parallel with or in a partially overlapping in time manner with other operations.

Figure 3A:
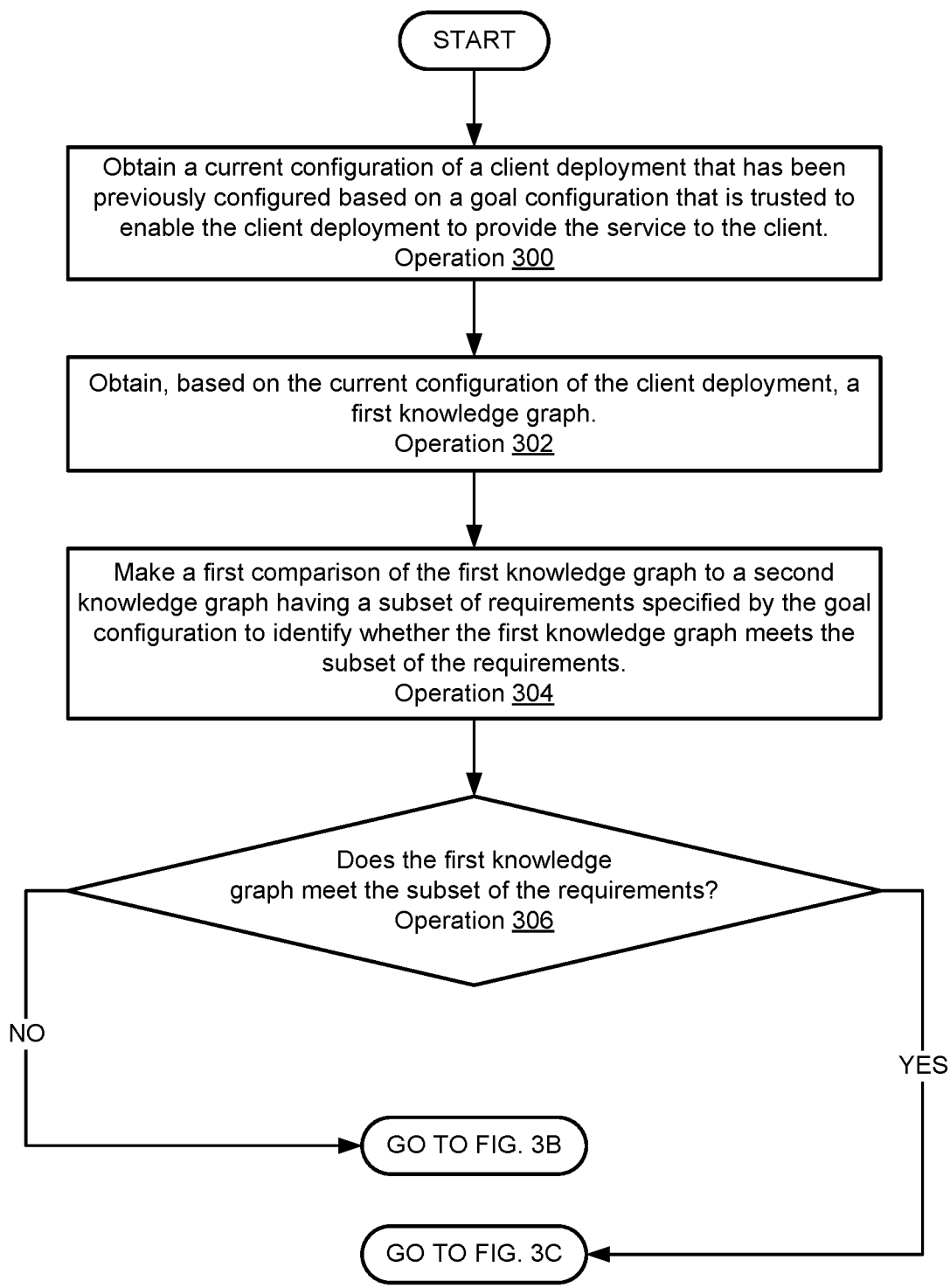
FIGS. 3A-3D show flow diagrams illustrating methods in accordance with an embodiment.

Turning to FIG. 3A, a first flow diagram illustrating a method of managing a configuration of a deployment to provide a service to a client in accordance with an embodiment is shown. The method may be performed, for example, by any of the components of the system of FIG. 1, and/or other components not shown therein.

At operation 300, a current configuration of a client deployment that has been previously configured based on a goal configuration that is trusted to enable the client deployment to provide service to the client may be obtained. The current configuration of the client deployment may be obtained by receiving the current configuration from a deployment manager, may be generated (e.g., by reading or otherwise obtaining information regarding the configuration of the client deployment), and/or via other methods.

At operation 302, a first knowledge graph, based on the current configuration of the client deployment, may be obtained. The first knowledge graph may be obtained by constructing the first knowledge graph using characteristics from the current configuration.

At operation 304, a first comparison of the first knowledge graph to a second knowledge graph having a subset of requirements specified by the goal configuration to identify whether the first knowledge graph meets the subset of the requirements may be made. The first comparison may be made by i) comparing first nodes of the first knowledge graph to second nodes of the second knowledge graph; ii) concluding that the first knowledge graph meets the subset of the requirements, in a first instance of the comparing where the first nodes match the second nodes; and iii) concluding that the first knowledge graph does not meet the subset of the requirements, in a second instance of the comparing where the first nodes do not match the second nodes.

The first nodes of the first knowledge graph may be compared to the second nodes of the second knowledge graph by traversing, based on at least characteristics of the client, the second knowledge graph to identify the second nodes. The second knowledge graph may be traversed by comparing configuration characteristics between a set of two nodes at similar positions, one node on first knowledge graph and the other node on the second knowledge graph. After the comparison is complete, a new set of two nodes may be selected at similar positions, one node on first knowledge graph and the other node on the second knowledge graph, that are connected to the set of two nodes.

The first knowledge graph may be concluded to meet the subset of requirements by identifying a set of nodes from the first knowledge graph that match another set of nodes from the second knowledge graph that include the subset of requirements.

The first knowledge graph may not be concluded to meet the subset of requirements by not identifying a set of nodes from the first knowledge graph that match another set of nodes from the second knowledge graph that both include the subset of requirements.

At operation 308, a determination may be made regarding whether the first knowledge graph meets the subset of requirements. The determination may be made by comparing the first knowledge graph to the second knowledge graph and identifying a set of nodes from the first knowledge graph that match another set of nodes from the second knowledge graph that include the subset of requirements.

Figure 3B:
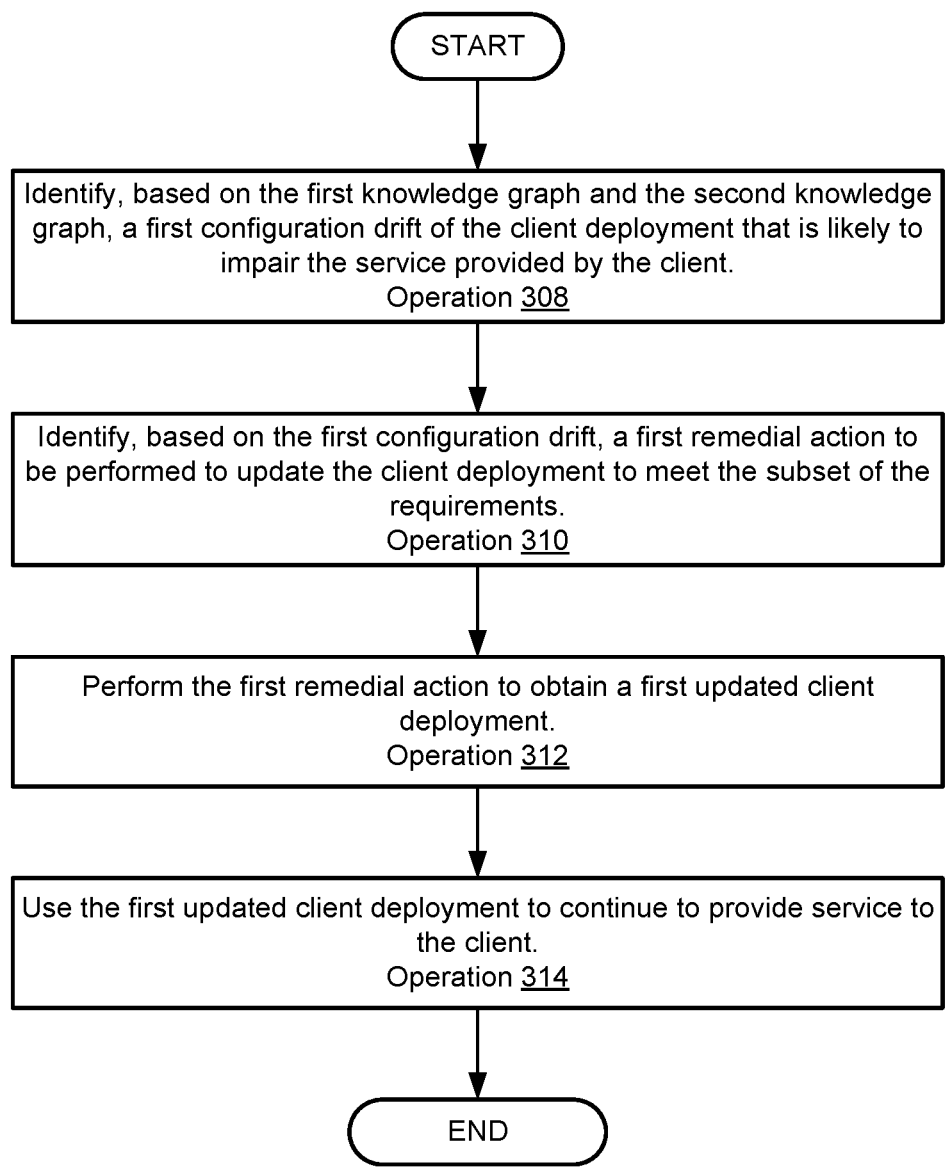

If the first knowledge graph does not meet the subset of the requirements, then the method may continue on FIG. 3B. Otherwise, if the first knowledge graph meets the subset of the requirements, then the method may continue on FIG. 3C.

Continuing on FIG. 3B, at operation 308, a first configuration drift of the client deployment that is likely to impair the service provided by the client may be identified, based on the first knowledge graph and the second knowledge graph. The first configuration drift may be identified by identifying the difference in the configurations from the first knowledge graph and the second knowledge graph.

At operation 310, a first remedial action may be identified, based on the first configuration drift, to be performed to update the client deployment to meet the subset of the requirements. The first remedial action may be identified by identifying the changes in the current configuration of the first knowledge graph that need to be made to meet the subset of the requirements.

At operation 312, the first remedial action may be performed to obtain a first updated client deployment. The first remedial action may be performed by applying the first remedial action to make changes on the current configuration to meet the subset of the requirements.

At operation 314, the first updated client deployment may be used to continue to provide service to the client. The first updated client deployment may be used by implementing the current configuration with the changes to meet the subset of requirements in the client deployment and using the current configuration to provide service to the client.

The method may following operation 314.

Figure 3C:
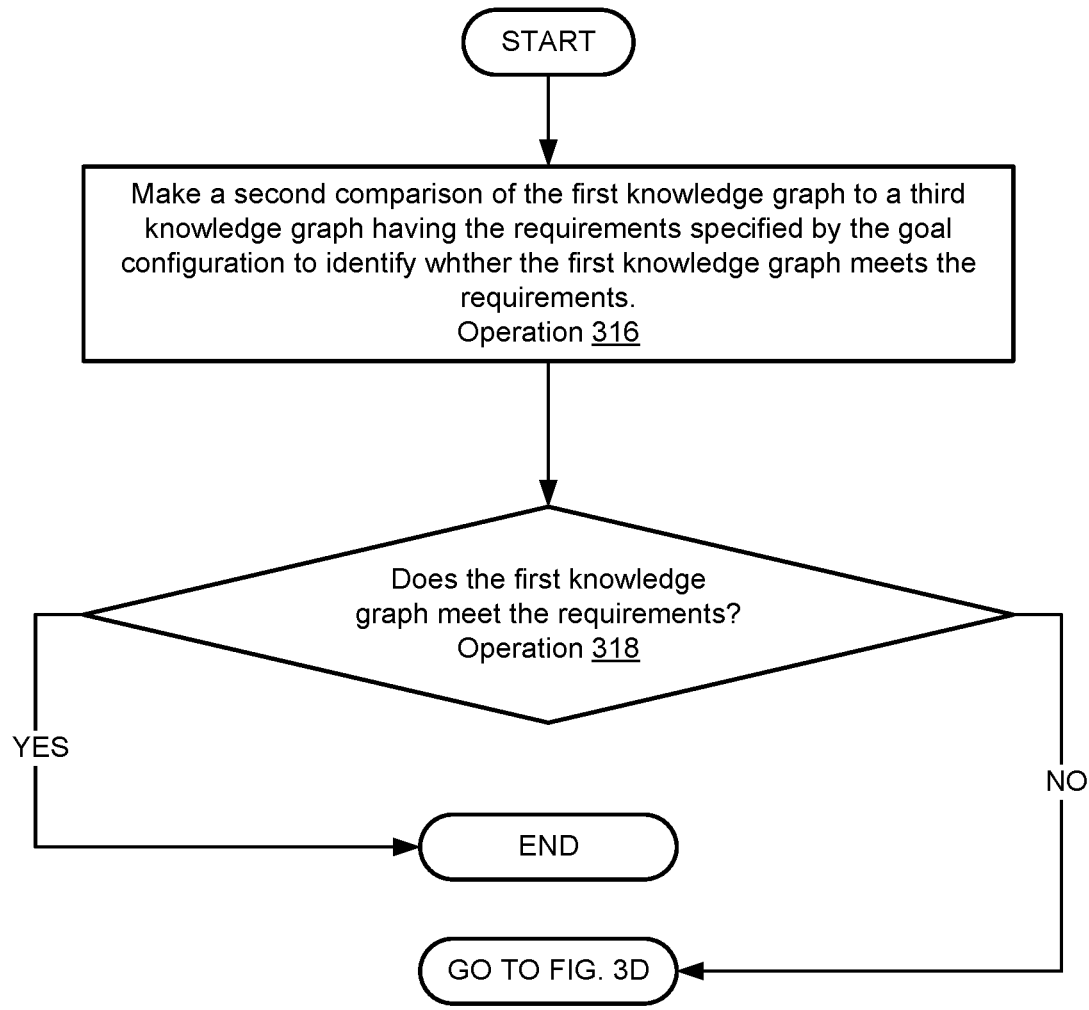

Returning to operation 306, continuing on to FIG. 3C, at operation 316, a second comparison of the first knowledge graph to a third knowledge graph having the requirements specified by the goal configuration to identify whether the first knowledge graph meets the requirements may be made. The second comparison may be made by i) comparing first nodes of the first knowledge graph to second nodes of the second knowledge graph; ii) concluding that the first knowledge graph meets the requirements, in a first instance of the comparing where the first nodes match the third nodes; and iii) concluding that the first knowledge graph does not meet the requirements, in a second instance of the comparing where the first nodes do not match the third nodes.

The first nodes of the first knowledge graph may be compared to the third nodes of the third knowledge graph by traversing, based on at least characteristics of the client, the third knowledge graph to identify the third nodes. The third knowledge graph may be traversed by comparing configuration characteristics between a set of two nodes at similar positions, one node on first knowledge graph and the other node on the third knowledge graph. After the comparison is complete, a new set of two nodes may be selected at similar positions, one node on first knowledge graph and the other node on the third knowledge graph, that are connected to the set of two nodes.

The first knowledge graph may be concluded to meet the requirements by identifying a set of nodes from the first knowledge graph that match another set of nodes from the third knowledge graph that include the requirements.

The first knowledge graph may not be concluded to meet the requirements by not identifying a set of nodes from the first knowledge graph that match another set of nodes from the third knowledge graph that both include the requirements.

At operation 318, a determination may be made regarding whether the first knowledge graph meets the requirements. The determination may be made by comparing the first knowledge graph to the third knowledge graph and identifying a set of nodes from the first knowledge graph that match another set of nodes from the third knowledge graph that include the requirements.

Figure 3D:
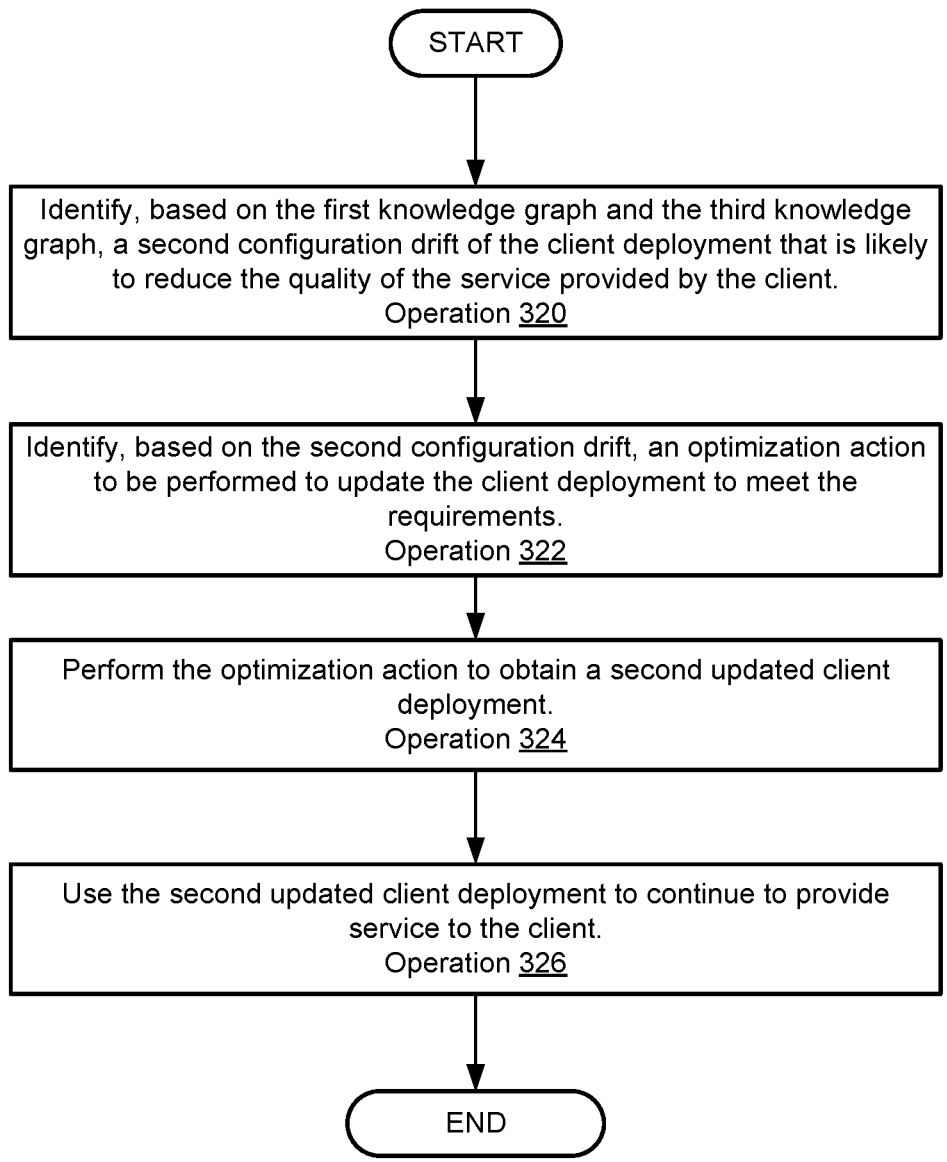

If the first knowledge graph does not meet the requirements, then the method may continue on FIG. 3D. Otherwise, if the first knowledge graph meets the requirements, then the method may end.

Turning to FIG. 3D, at operation 320, a second configuration drift of the client deployment that is likely to reduce the quality of the service provided by the client may be identified, based on the first knowledge graph and the third knowledge graph. The second configuration drift may be identified by identifying the difference in the configurations from the first knowledge graph and the third knowledge graph.

At operation 322, an optimization action may be identified, based on the second configuration drift, to be performed to update the client deployment to meet the requirements. The optimization action may be identified by identifying the changes in the current configuration of the first knowledge graph that need to be made to meet the requirements.

At operation 324, the optimization action may be performed to obtain a second updated client deployment. The optimization action may be performed by applying the optimization action to make changes on the current configuration to meet the requirements.

At operation 326, the second updated client deployment may be used to continue to provide service to the client. The second updated client deployment may be used by implementing the current configuration with the changes to meet the requirements in the client deployment and using the current configuration to provide service to the client.

The method may end following operation 326.

Figure 4:
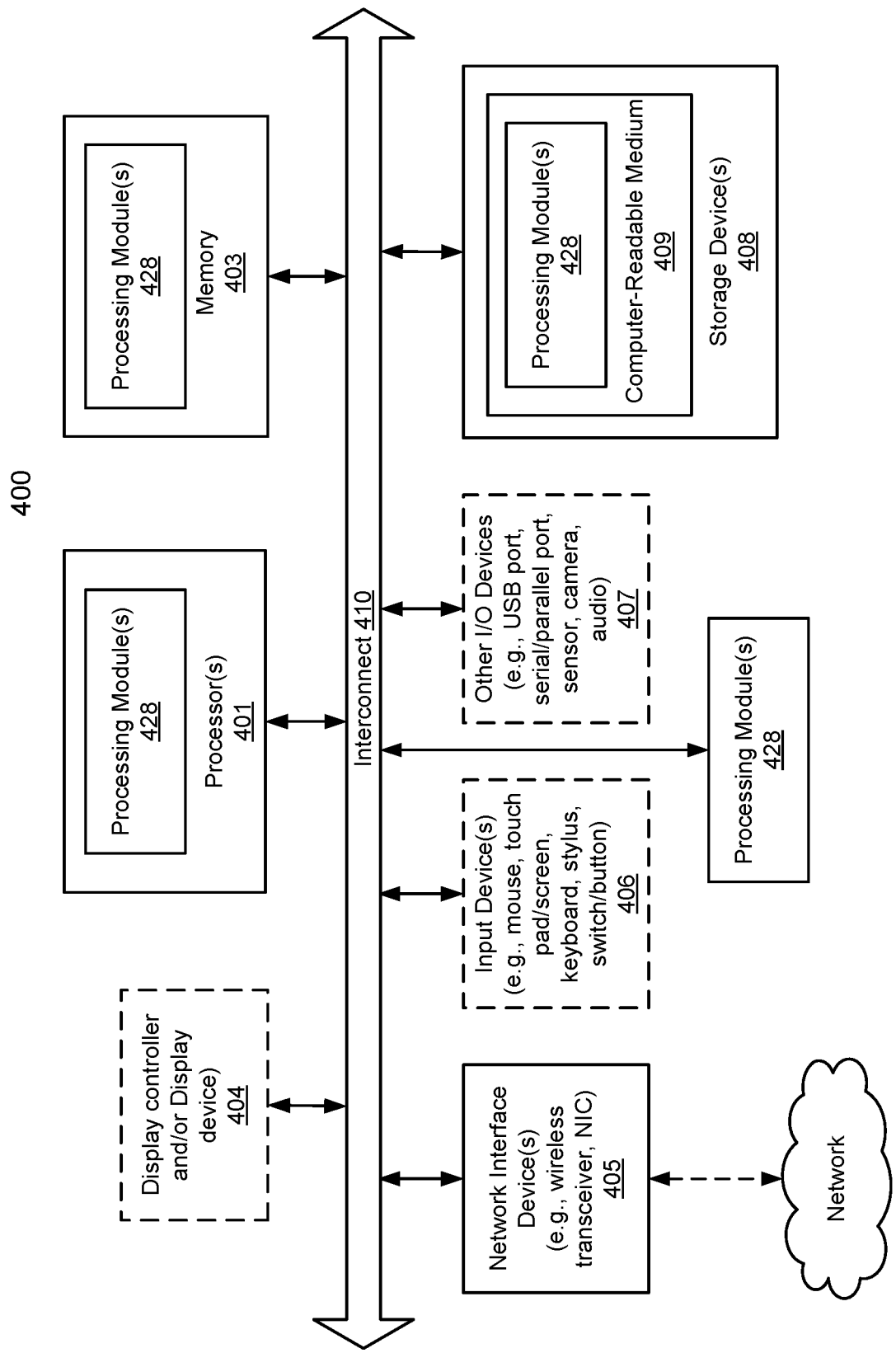
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components.

These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing a configuration of a client deployment to provide a service to a client, the method comprising:
    obtaining a current configuration of a client deployment that has been previously configured based on a goal configuration that is trusted to enable the client deployment to provide the service to the client;
    obtaining, based on the current configuration of the client deployment, a first knowledge graph;
    making a first comparison of the first knowledge graph to a second knowledge graph having a subset of requirements specified by the goal configuration to identify whether the first knowledge graph meets the subset of the requirements;
    in a first instance of the comparing where the first knowledge graph does not meet the subset of the requirements:
        identifying, based on the first knowledge graph and the second knowledge graph, a first configuration drift of the client deployment that is likely to impair the service provided to the client;

identifying, based on the first configuration drift, a first remedial action to be performed to update the client deployment to meet the subset of the requirements;
performing the first remedial action to obtain a first updated client deployment; and
using the first updated client deployment to continue to provide the service to the client.

2. The method of claim 1, further comprising:
in a second instance of the comparing where the first knowledge graph meets the subset of the requirements:
making a second comparison of the first knowledge graph to a third knowledge graph having the requirements specified by the goal configuration to identify whether the first knowledge graph meets the requirements;
in a first instance of the second comparison where the first knowledge graph does not meet the requirements:
identifying, based on the first knowledge graph and the third knowledge graph, a second configuration drift of the client deployment that is likely to reduce a quality of the service provided to the client;
identifying, based on the second configuration drift, an optimization action to be performed to update the client deployment to meet the requirements;
performing the optimization action to obtain a second updated client deployment; and
using the second updated client deployment to continue to provide the service to the client.

3. The method of claim 2, wherein the first knowledge graph documents the current configuration of the client deployment, the first knowledge graph comprising:
nodes that represent characteristics for the client deployment; and
edges that represent relationships of the characteristics of the client deployment.

4. The method of claim 3, wherein the second knowledge graph documents a configuration having a subset of requirements specified by the goal configuration of the client deployment, the second knowledge graph comprising:
second nodes that represent second characteristics for the client deployment; and
second edges that represent second relationships of the characteristics of the client deployment.

5. The method of claim 4, wherein the third knowledge graph documents the goal configuration for the client deployment, the third knowledge graph comprising:
third nodes that represent third characteristics for the client deployment; and
third edges that represent third relationships of the third characteristics for the client deployment.

6. The method of claim 2, wherein the first configuration drift indicates a difference in characteristics for the client deployment between the first knowledge graph and the second knowledge graph.

7. The method of claim 6, wherein the second configuration drift indicates a difference in characteristics for the client deployment between the first knowledge graph and the third knowledge graph.

8. The method of claim 2, wherein making the first comparison comprises:
comparing first nodes of the first knowledge graph to second nodes of the second knowledge graph;
in a first instance of the comparing where the first nodes match the second nodes:
concluding that the first knowledge graph meets the subset of the requirements; and
in a second instance of the comparing where the first nodes do not match the second nodes:
concluding that the first knowledge graph does not meet the subset of the requirements.

9. The method of claim 8, wherein comparing the first nodes of the first knowledge graph to the second nodes of the second knowledge graph comprises:
traversing, based on at least characteristics of the client, the second knowledge graph to identify the second nodes.

10. The method of claim 9, wherein the second knowledge graph comprises a set of nodes, at least a first portion of the set of nodes are based on the characteristics of the client and a second portion of the set of nodes are based on the subset of the requirements, and the second nodes are part of the second portion of the set of nodes.

11. The method of claim 8, wherein making the second comparison comprises:
comparing first nodes of the first knowledge graph to third nodes of the third knowledge graph;
in a first instance of the comparing of the first nodes to the third nodes where the first nodes match the third nodes:
concluding that the first knowledge graph meets the requirements; and
in a second instance of the comparing of the first nodes to the third nodes where the first nodes do not match the third nodes:
concluding that the first knowledge graph does not meet the requirements.

12. The method of claim 11, wherein comparing the first nodes of the first knowledge graph to the third nodes of the third knowledge graph comprises:
traversing, based on at least characteristics of the client, the third knowledge graph to identify the third nodes.

13. The method of claim 12, wherein the third knowledge graph comprises a set of nodes, at least a first portion of the set of nodes are based on the characteristics of the client and a second portion of the set of nodes are based on the requirements, and the third nodes are part of the second portion of the set of nodes.

14. A non-transitory machine-readable medium having instructions stored therein, which when executed by a processor, cause the processor to perform operations for managing a configuration of a client deployment to provide a service to a client, the operation comprising:
obtaining a current configuration of a client deployment that has been previously configured based on a goal configuration that is trusted to enable the client deployment to provide the service to the client;
obtaining, based on the current configuration of the client deployment, a first knowledge graph;
making a first comparison of the first knowledge graph to a second knowledge graph having a subset of requirements specified by the goal configuration to identify whether the first knowledge graph meets the subset of the requirements;
in a first instance of the comparing where the first knowledge graph does not meet the subset of the requirements:
identifying, based on the first knowledge graph and the second knowledge graph, a first configuration drift of the client deployment that is likely to impair the service provided to the client;

identifying, based on the first configuration drift, a first remedial action to be performed to update the client deployment to meet the subset of the requirements;

performing the first remedial action to obtain a first updated client deployment; and using the first updated client deployment to continue to provide the service to the client.

15. The non-transitory machine-readable medium of claim 14, further comprising:

in a second instance of the comparing where the first knowledge graph meets the subset of the requirements:

making a second comparison of the first knowledge graph to a third knowledge graph having the requirements specified by the goal configuration to identify whether the first knowledge graph meets the requirements;

in a first instance of the second comparison where the first knowledge graph does not meet the requirements:

identifying, based on the first knowledge graph and the third knowledge graph, a second configuration drift of the client deployment that is likely to reduce a quality of the service provided to the client;

identifying, based on the second configuration drift, an optimization action to be performed to update the client deployment to meet the requirements;

performing the optimization action to obtain a second updated client deployment; and using the second updated client deployment to continue to provide the service to the client.

16. The non-transitory machine-readable medium of claim 14, wherein the first knowledge graph documents the current configuration of the client deployment, the first knowledge graph comprising:

nodes that represent characteristics for the client deployment; and edges that represent relationships of the characteristics of the client deployment.

17. The non-transitory machine-readable medium of claim 16, wherein the second knowledge graph documents a configuration having a subset of requirements specified by the goal configuration of the client deployment, the first knowledge graph comprising:

second nodes that represent second characteristics for the client deployment; and second edges that represent second relationships of the characteristics of the client deployment.

18. A data processing system, comprising:

a processor; and a memory coupled to the processor to store instructions, which when executed by the processor, cause the processor to perform operations for managing a configuration of a client deployment to provide a service to a client, the operations comprising:

obtaining a current configuration of a client deployment that has been previously configured based on a goal configuration that is trusted to enable the client deployment to provide the service to the client;

obtaining, based on the current configuration of the client deployment, a first knowledge graph;

making a first comparison of the first knowledge graph to a second knowledge graph having a subset of requirements specified by the goal configuration to identify whether the first knowledge graph meets the subset of the requirements;

in a first instance of the comparing where the first knowledge graph does not meet the subset of the requirements:

identifying, based on the first knowledge graph and the second knowledge graph, a first configuration drift of the client deployment that is likely to impair the service provided to the client;

identifying, based on the first configuration drift, a first remedial action to be performed to update the client deployment to meet the subset of the requirements;

performing the first remedial action to obtain a first updated client deployment; and using the first updated client deployment to continue to provide the service to the client.

19. The data processing system of claim 18, further comprising:

in a second instance of the comparing where the first knowledge graph meets the subset of the requirements:

making a second comparison of the first knowledge graph to a third knowledge graph having the requirements specified by the goal configuration to identify whether the first knowledge graph meets the requirements;

in a first instance of the second comparison where the first knowledge graph does not meet the requirements:

identifying, based on the first knowledge graph and the third knowledge graph, a second configuration drift of the client deployment that is likely to reduce a quality of the service provided to the client;

identifying, based on the second configuration drift, an optimization action to be performed to update the client deployment to meet the requirements;

performing the optimization action to obtain a second updated client deployment; and using the second updated client deployment to continue to provide the service to the client.

20. The data processing system of claim 18, wherein the first knowledge graph documents the current configuration of the client deployment, the first knowledge graph comprising:

nodes that represent characteristics for the client deployment; and edges that represent relationships of the characteristics of the client deployment.

* * * * *